(12) United States Patent
Wei et al.

(10) Patent No.: US 6,987,780 B2
(45) Date of Patent: Jan. 17, 2006

(54) RLP RETRANSMISSION FOR CDMA COMMUNICATION SYSTEMS

(75) Inventors: Yongbin Wei, San Diego, CA (US); Sai Yiu Duncan Ho, San Diego, CA (US); Nikolai K. N. Leung, Takoma Park, MD (US)

(73) Assignee: Qualcomm, Incorporated, San Diego, CA (US)

( * ) Notice: Subject to any disclaimer, the term of this patent is extended or adjusted under 35 U.S.C. 154(b) by 290 days.

(21) Appl. No.: 10/166,300

(22) Filed: Jun. 10, 2002

(65) Prior Publication Data

US 2003/0227875 A1 Dec. 11, 2003

(51) Int. Cl.
*H04J 3/22* (2006.01)

(52) U.S. Cl. .................. 370/469; 370/342; 370/441
(58) Field of Classification Search ............... 370/278, 370/282, 329, 341, 342, 441, 437, 447, 469
See application file for complete search history.

(56) References Cited

U.S. PATENT DOCUMENTS

| | | | | |
|---|---|---|---|---|
| 6,208,620 | B1 * | 3/2001 | Sen et al. ................. | 370/231 |
| 6,611,515 | B1 * | 8/2003 | Balachandran et al. ..... | 370/349 |
| 2001/0032325 | A1 * | 10/2001 | Fong et al. ............... | 714/18 |
| 2002/0001296 | A1 * | 1/2002 | Lee et al. ................. | 370/338 |
| 2002/0009067 | A1 * | 1/2002 | Sachs et al. .............. | 370/338 |
| 2003/0035440 | A1 * | 2/2003 | Casaccia et al. .......... | 370/473 |
| 2003/0156599 | A1 * | 8/2003 | Casaccia et al. .......... | 370/474 |

FOREIGN PATENT DOCUMENTS

| | | | |
|---|---|---|---|
| EP | 771092 A1 | * | 5/1997 |
| EP | 948154 A2 | * | 10/1999 |

OTHER PUBLICATIONS

Banerjee, A. et al. "Comparison of Different Retransmission Strategies for Bandwith Efficient Hybrid ARQ Schemes Using Turbo Codes," IEEE International Conference on Personal Wireless Communications. Dec. 17–20, 2000 and pp. 548–552.*

Van Nguyen, A. et al. "Hybrid ARQ Protocols Using Space-Time Codes," IEEE Vehicular Technology Conference. Oct. 7–11, 2001. vol. 4, pp. 2364–2368.*

* cited by examiner

*Primary Examiner*—John Pezzlo
*Assistant Examiner*—Donald L Mills
(74) *Attorney, Agent, or Firm*—Philip R. Wadsworth; Thien T. Nguyen

(57) ABSTRACT

Techniques for retransmitting data via RLP in a CDMA (e.g., cdma2000) system with a first retransmission mechanism provided by the RLP and a second retransmission mechanism provided by an HARQ-CF. In one method, missing RLP frames are first detected (e.g., by a receiver RLP). A dynamic timer is then maintained (e.g., by a receiver HARQ-CF) for each RLP frame detected to be missing. The dynamic timers are event-driven and have variable time durations. Each dynamic timer is updated based on events known to the receiver HARQ-CF. Fixed timers with fixed time durations may also be maintained (e.g., by the receiver RLP) for the missing RLP frames. Whether or not a missing RLP frame is lost is determined based on the dynamic timer and the fixed timer (if any) maintained for the RLP frame. A NAK may be issued for retransmission of each RLP frame deemed to be lost.

31 Claims, 9 Drawing Sheets

RLP RETRANSMISSION FOR CDMA COMMUNICATION SYSTEMS

BACKGROUND

1. Field

The present invention relates generally to data communication, and more specifically to techniques for retransmitting packets by a Radio Link Protocol (RLP) in CDMA communication systems.

2. Background

Wireless communication systems are widely deployed to provide various types of services such as voice, packet data, and so on. These systems may be multiple-access systems capable of supporting communication with multiple users, and may be based on code division multiple access (CDMA), time division multiple access (TDMA), frequency division multiple access (FDMA), or some other multiple access techniques. CDMA systems may provide certain advantages over other types of systems, including increased system capacity.

To improve the reliability of data transmission, many CDMA systems employ a retransmission mechanism provided by a Radio Link Protocol (RLP) that resides above the physical layer. An RLP entity at the receiver (i.e., the receiver RLP) is provided with RLP frames by a lower-level entity, with each RLP frame being uniquely identified by its assigned sequence number. Since the RLP frames to be transmitted are assigned sequential sequence numbers, the receiver RLP is able to determine whether or not any RLP frames are missing by looking at the sequence numbers of the received RLP frames. In the absence of any other retransmission mechanism, the RLP frames may be transmitted serially to the receiver, and any RLP frame detected to be missing by the receiver RLP may be immediately reported to the transmitter via a transmission of a negative acknowledgment (NAK). The missing RLP frames may thereafter be retransmitted to the receiver.

To provide improved packet data transmission capability, some newer-generation CDMA systems (e.g., cdma2000 Release C) employ another retransmission mechanism provided by a hybrid automatic retransmission control function (HARQ-CF) that resides between the RLP and the physical layer. The HARQ-CF defined by cdma2000 is able to transmit multiple HARQ packets in parallel, with each HARQ packet including one or more RLP frames. Moreover, because each HARQ packet may be transmitted/retransmitted once or multiple times by the HARQ-CF, the HARQ packets may be recovered in an unknown order by the HARQ-CF entity at the receiver (i.e., the receiver HARQ-CF). Thus, RLP frames may be provided out of sequence to the receiver RLP. In addition, because of retransmission by the HARQ-CF, the receiver RLP may have to wait a long time period before it can determine with confidence that a given missing RLP is really lost. The HARQ-CF retransmission may thus severely impact the performance of the RLP retransmission.

There is therefore a need in the art for an RLP retransmission scheme that can operate efficiently in conjunction with the underlying HARQ-CF retransmission mechanism.

SUMMARY

Techniques are provided herein to exploit the functionality of the RLP and HARQ-CF so that they can operate in a seamless and efficient manner to improve system performance. These techniques utilize different information available at different entities to implement an RLP transmission scheme that can provide improved performance.

In an embodiment, a method is provided for retransmitting data via the RLP in a CDMA (e.g., cdma2000) communication system with a first retransmission mechanism provided by the RLP and a second retransmission mechanism provided by the HARQ-CF. In accordance with the method, missing RLP frames are first detected (e.g., by the receiver RLP). A dynamic timer is then maintained (e.g., by the receiver HARQ-CF) for each RLP frame detected to be missing. Each dynamic timer is thereafter updated based on events known to the receiver HARQ-CF, and the expiration of each dynamic timer is triggered by these events. Fixed timers with fixed time durations may also be maintained (e.g., by the receiver RLP) for the missing RLP frames. The determination of whether or not each missing RLP frame is lost is then made based on the dynamic timer (and the fixed timer, if any) maintained for the RLP frame. A NAK may then be issued (e.g., by the receiver RLP) for retransmission of each RLP frame deemed to be lost.

In an embodiment, the dynamic timers are event-driven, and each dynamic timer has a variable time duration that is determined by events known to the receiver HARQ-CF. For cdma2000, the RLP frames are included in HARQ packets transmitted by the HARQ-CF, and each HARQ packet may be transmitted on any one of a number of possible ARQ channels (which may be viewed as logical channels). The dynamic timer for each missing RLP frame may then be associated with a respective candidate set of ARQ channels that may be used to transmit the HARQ packet that includes the missing RLP frame. Each ARQ channel in a candidate set may be removed from the set if it is determined that the ARQ channel could not be the one used to transmit the missing RLP frame. The dynamic timer for each RLP frame then expires when the associated candidate set becomes empty, since this means that there is no ARQ channel left that could be used to transmit the missing RLP frame.

The characteristics of the HARQ-CF may be used to select a set of criteria used to remove ARQ channels from candidate sets. For cdma2000, an ARQ channel may be removed from a candidate set if any one of the following events occurs after the dynamic timer is triggered: (1) a good HARQ packet is received via the ARQ channel, (2) a new HARQ packet is transmitted via the ARQ channel, or (3) no transmission is received via the ARQ channel within a particular period. These criteria are described in further detail below.

In general, the techniques described herein may be used for retransmitting data in any wireless communication system with a first retransmission mechanism in a first sublayer (e.g., RLP) and a second retransmission mechanism in a second sublayer (e.g., HARQ-CF), where the second sublayer resides below the first sublayer in the protocol stack.

Various aspects and embodiments of the invention are described in further detail below. The invention further provides methods, program codes, digital signal processors, receiver units, transmitter units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
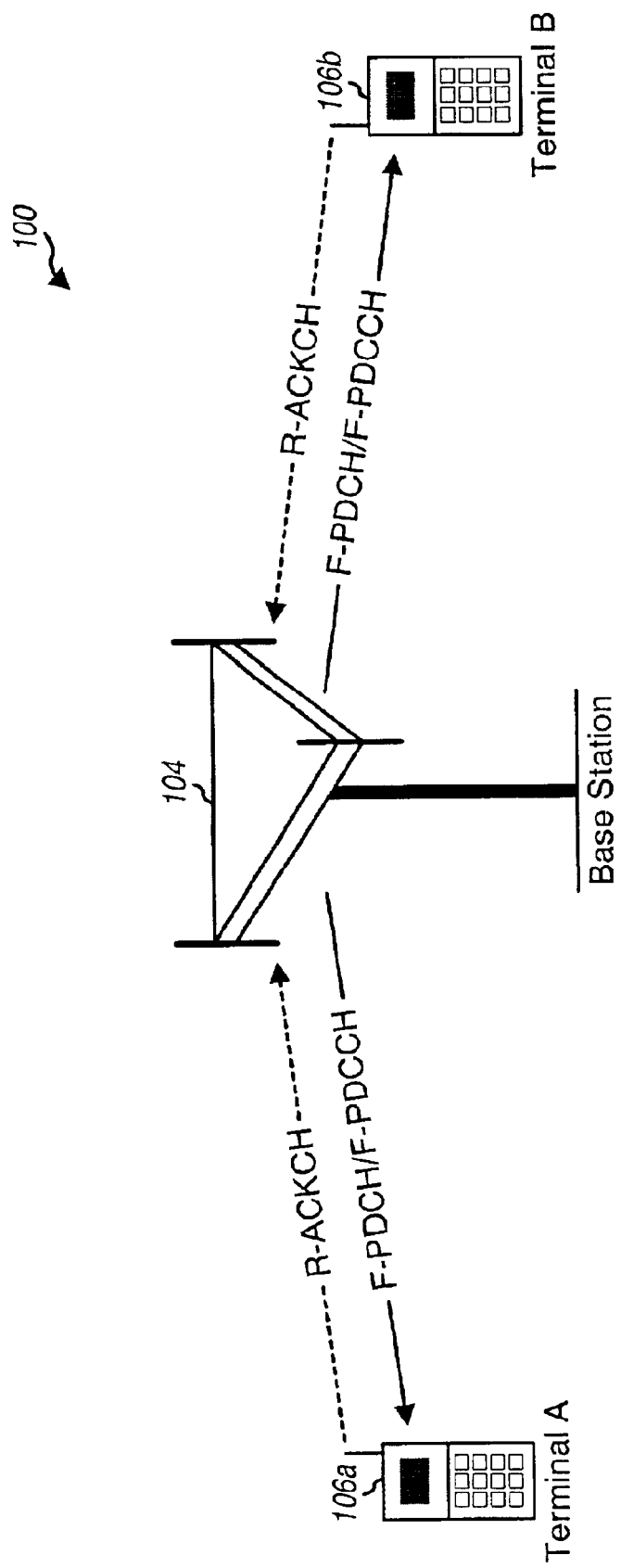
FIG. 1 is a diagram of a CDMA communication system.

FIG. 1 is a diagram of a CDMA communication system 100 that may implement various aspects and embodiments of the RLP retransmission techniques described herein. System 100 includes a number of base stations 104 that communicate with a number of terminals 106a, 106b (only one base station and two terminals are shown in FIG. 1 for simplicity). A base station is a fixed station used for communicating with the terminals. Depending on the context in which the term is used, a base station may refer to a cell, a sector within a cell, a base transceiver system (BTS), a mobile station controller (MSC), or other part of the communication system. A base station is also referred to as an access point, a Node B, or some other terminology. The base stations may be part of a UMTS Radio Access Network (UTRAN).

A terminal is a station that communicates with the base station. A terminal is also referred to as a mobile station, a remote station, an access terminal, a user equipment (UE), or some other terminology. Each terminal may communicate with one or more base stations on the forward link and/or reverse link at any given moment, depending on whether or not the terminal is active, whether or not soft handoff is supported for the data transmission, and whether or not the terminal is in soft handoff. The forward link (i.e., downlink) refers to transmission from the base station to the terminal, and the reverse link (i.e., uplink) refers to transmission from the terminal to the base station.

The techniques described herein for RLP retransmission may be implemented in various CDMA communication systems. Thus, CDMA system 100 may implement one or more commonly known CDMA standards such as cdma2000, IS-856, W-CDMA, IS-95, and others. For clarity, various aspects, embodiments, and implementation details for RLP retransmission are described below for a CDMA system that supports cdma2000 Release C.

cdma2000 supports various types of services such as voice, packet data, and so on. cdma2000 Release C further supports high-speed packet data transmission on the forward link via a packet data channel and an entity that controls the operation of the packet data channel. The packet data channel comprises a set of physical channels, which are:

F-PDCH—forward packet data channel. This physical channel carries data for the high-speed packet data transmission.

F-PDCCH—forward packet data control channel. This physical channel carries control information for the F-PDCH.

R-ACKCH—reverse acknowledgment channel. This physical channel carries acknowledgment feedback for an automatic retransmission (ARQ) protocol.

R-CQICH—reverse channel quality indication channel. This physical channel carries forward link RF channel quality feedback and is further used to indicate a specific base station selected by the terminal for F-PDCH operation.

The control entity for the packet data channel is referred to as the packet data channel control function (PDCHCF) entity or the hybrid automatic retransmission control function (HARQ-CF) entity. This control entity implements procedures for operating the physical channels associated with the packet data channel.

Figure 2:
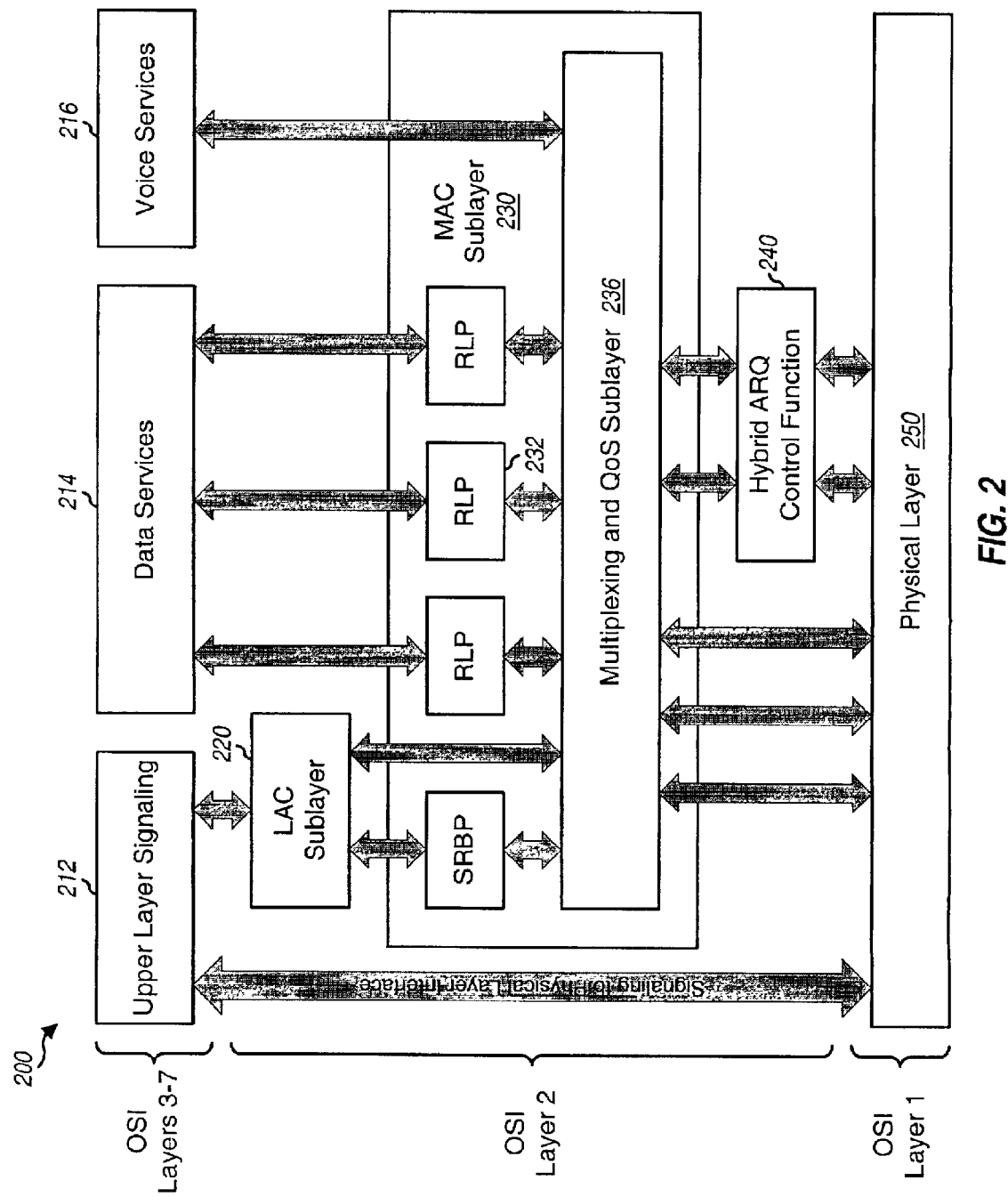
FIG. 2 is a diagram of a layer structure defined by cdma2000 Release C.

FIG. 2 is a diagram of a layer structure 200 defined by cdma2000 Release C. Layer structure 200 includes (1) applications and upper layer protocols that approximately correspond to Layers 3 through 7 of the ISO/OSI reference model, (2) protocols and services that correspond to Layer 2 (the link layer), and (3) protocols and services that correspond to Layer 1 (the physical layer 250).

The applications and upper layer protocols utilize the services provided by the sublayers in Layer 2 (i.e., the LAC and MAC sublayers). Examples of supported applications include signaling services 212, packet data services 214, voice services 216, and circuit data applications. Layer structure 200 supports a combination of voice, packet data, and circuit data services to operate concurrently.

Layer 2 includes a Link Access Control (LAC) sublayer 220, a Medium Access Control (MAC) sublayer 230, and a hybrid ARQ control function (HARQ-CF) 240. The MAC sublayer comprises a Radio Link Protocol (RLP) 232 and a multiplexing and QoS sublayer 236 (which is also referred to as the multiplex sublayer). The RLP provides best effort delivery of packet data to ensure reasonably reliable data transmission over the radio link. The multiplex sublayer provides the interface between the RLP and HARQ-CF. The multiplex sublayer further implements a control mechanism to balance varying quality of service (QoS) requirements of multiple concurrent services to ensure that the negotiated QoS levels for these services are met. This is achieved by mediating conflicting requests from competing services and prioritizing access requests. The structure of the MAC sublayer and the entities that comprise the MAC sublayer are described in detail in document TIA/EIA/IS-2000.3-C, entitled "Medium Access Control (MAC) Standard for cdma2000 Spread Spectrum Systems," Release C, which is incorporated herein by reference.

The HARQ-CF performs a number of functions related to data transmission on the packet data channel. First the HARQ-CF terminates all of the physical channels associated with the packet data channel (i.e., the F-PDCH, F-PDCCHs, R-ACKCH, and R-CQICH). Second, the HARQ-CF provides an automatic retransmission (ARQ) protocol that ensures reliable delivery of encoder packets from the base station to the terminal via retransmission of portions of encoder packets based on feedback from the mobile station. This feedback is in the form of an acknowledgment (ACK) to indicate successful decoding of an encoder packet or a negative acknowledgment (NAK) to indicate an unsuccessful decoding of the encoder packet.

The physical layer 250 provides the mechanism for transmitting data for the MAC sublayer and signaling for the upper layer. The physical layer is described in detail in document TIA/EIA/IS-2000.2-C, entitled "Physical Layer Standard for cdma2000 Spread Spectrum Systems," Release C, which is incorporated herein by reference.

Figure 3:
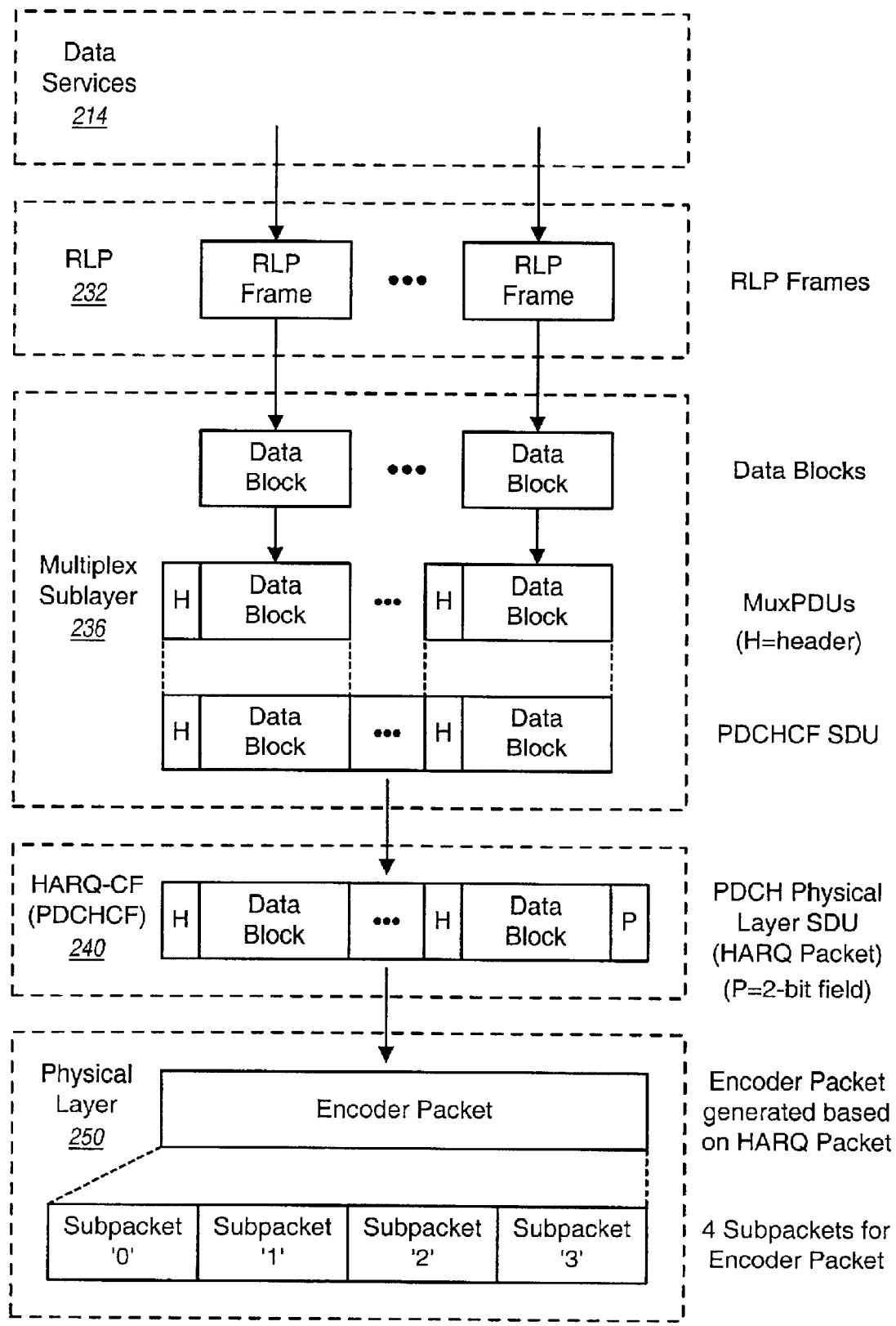
FIG. 3 is a diagram illustrating the data encapsulation performed by a base station for data transmission on a packet data channel.

FIG. 3 is a diagram illustrating the data encapsulation performed by the base station for data transmission on the packet data channel. In cdma2000 Release C, data to be transmitted on the packet data channel to a particular terminal is requested from the data services 214 by the multiplex sublayer 236. The entity that provides data from a data service to the multiplex sublayer is the RLP 232.

The RLP receives data from the data services and forms RLP frames. Each RLP frame includes a sequence number that uniquely identifies the RLP frame and the data from the data service. The RLP then provides RLP frames to the multiplex sublayer.

The multiplex sublayer receives the RLP frames, which are simply viewed as data blocks by this sublayer. The multiplex sublayer then processes each data block by adding a header (H). The combination of the header and the data block is referred to as a multiplex sublayer Protocol Data Unit (MuxPDU) in cdma2000. The multiplex sublayer then encapsulates one or more MuxPDUs to form a PDCHCF SDU (Service Data Unit).

The multiplex sublayer generates a PDCHCF SDU for transmission on the F-PDCH whenever it receives an indication to do so. To form each PDCHCF SDU, the multiplex sublayer requests data blocks from logical channels that have been mapped to the F-PDCH, in a particular order based on the relative priority of each logical channel. This continues until enough data blocks have been supplied to form the number of MuxPDUs needed to fill the PDCHCF SDU, or until all mapped logical channels have supplied all available data blocks. The multiplex sublayer then creates a MuxPDU for each received data block.

The multiplex sublayer then serially concatenates one or more MuxPDUs to form the PDCHCF SDU. The PDCHCF SDU has variable length and may include any number of MuxPDUs. The specific number of MuxPDUs to include in each PDCHCF SDU is determined by the HARQ-CF 240 (i.e., PDCHCF). If the PDCHCF SDU is not completely filled, then the multiplex sublayer inserts one or more padding MuxPDUs to completely fill the PDCHCF SDU. Each padding MuxPDU contains '0' bits. The multiplex sublayer then provides the assembled PDCHCF SDU to the HARQ-CF.

The HARQ-CF processes each PDCHCF SDU received from the multiplex sublayer by appending a 2-bit field (P) at the end of the PDCHCF SDU to form a corresponding PDCH Physical Layer SDU, which is referred to herein as an HARQ packet. The HARQ-CF then provides the HARQ packet to the physical layer 250.

The physical layer Turbo encodes each HARQ packet to generate a corresponding encoder packet. A portion of or the whole encoder packet may be transmitted via the physical layer channel as a subpacket of the encoder packet. A subpacket is identified by a unique subpacket identifier (SPID). In particular, an encoder packet can be transmitted as subpackets with SPIDs of '0', '1', '2', and '3'. Each subpacket includes a sufficient amount of coded data to allow the receiver to decode the received subpacket and recover the HARQ packet. Different subpackets typically include different portions of an encoder packet. The four subpackets may be viewed as different versions of the encoder packet.

Subpackets are typically generated on fly (i.e., dynamically) based on the transmit format provided by the HARQ-CF. Specifically, the subpackets for an encoder packet will correspond to different portions of the encoder packet if the HARQ-CF determines to use different transmit formats, even though the subpackets have the same ACID.

The physical layer then transmits one subpacket at a time to the terminal in accordance with a defined transmission procedure, as described below.

When a base station transmits a subpacket of an encoder packet to a particular mobile station, the base station needs to wait for a certain amount of time before receiving any feedback from this terminal for the transmitted subpacket. This is because it takes time to transmit the subpacket on the forward link and to transmit the feedback on the reverse link. The associated processing at the base station and at the terminal also takes time. To eliminate dead time and enhance performance, the base station may transmit other encoder packets to the same or another terminal while waiting for the feedback of the encoder packet from this terminal. This can be done by the HARQ-CF that is used to support packet data channel transmission on four independent ARQ channels, which may be viewed as four logical channels of the FPDCH. These four ARQ channels permit the base station to transmit up to four encoder packets in parallel to a given terminal via four pending encoder packet transactions. Thus, at any given moment, there can be up to four outstanding encoder packets (i.e., packets that have not yet been acknowledged as being correctly received by the terminal).

The specific number of ARQ channels to use is determined by the base station and signaled to the terminal. These ARQ channels are uniquely identified by an ARQ channel identifier (ACID) assigned to each ARQ channel. For example, the four ARQ channels may be assigned ACIDs of '0', '1', '2', and '3'. The ACID for each subpacket transmitted on the F-PDCH is uniquely identified by control information sent on the accompanying F-PDCCH. Therefore, there is no ambiguity at the terminal regarding what subpackets to combine prior to the decoding operation.

The HARQ-CF at the base station transmits the subpackets for each encoder packet in accordance with a set of rules. Each encoder packet is transmitted and possibly retransmitted on a single ARQ channel. For a given encoder packet, the base station transmits subpacket '0' before any other subpackets for the encoder packet. The base station can transmit subpackets '0', '1', '2', or '3' any number of time, in any order and at any time, as long as the total number of subpackets transmitted for the encoder packet does not exceed eight. The base station can transmit any subpacket multiple times, and can also omit any subpacket other than subpacket '0'.

The subpackets for a given encoder packet may be transmitted over different transmission lengths (or durations). It is also possible for the base station to retransmit the same subpacket more than one time using different transmission lengths.

Because of the redundant information in the subpackets, it is possible for the terminal to successfully decode the encoder packet before all four subpackets have been transmitted. When the terminal receives a subpacket, it attempts to decode the encoder packet based on all subpackets that have been received for this encoder packet (i.e., the subpackets for the current and prior transmissions). If the decoding operation is successful (i.e., the CRC for the encoder packet is valid), then the terminal sends an ACK on the R-ACKCH channel, and the base station can stop sending subpackets for this encoder packet. Conversely, if the decoding operation is unsuccessful (i.e., the CRC for the encoder packet is invalid), then the terminal sends a NAK on the R-ACKCH channel. The base station can use the ACK/NAK feedback from the terminal to transmit additional subpackets for the encoder packet.

Because the terminal combines current and prior received subpackets for the same encoder packet prior to decoding, a mechanism is provided to allow the terminal to determine when a subpacket received within the same ARQ channel (i.e., the same ACID) is for a new encoder packet. In this way, the terminal can purge subpackets previously received on the same ARQ channel for a prior encoder packet and start accumulating subpackets for the new encoder packet. For cdma2000, this mechanism comprises an ARQ identifier sequence (ARQ_IS) number that is included in the accompanying control message transmitted the F-PDCCH by the base station. The ARQ_IS number is a single bit value that toggles between '0' and '1' for consecutive encoder packets transmitted on the same ARQ channel and is effectively a 1-bit sequence number. The ARQ_IS number is also referred to herein as the "color" bit.

When the first subpacket for a new encoder packet is transmitted on an ARQ channel, the receiver is signaled that this is a new encoder packet by a flipped color bit. In particular, the color bit for all subpackets of a particular encoder packet transmitted on a given ARQ channel is set to a particular value (e.g., '1'), the color bit for all subpackets of the next encoder packet transmitted on the same ARQ channel is set to the alternate value (e.g., '0'), and so on. If the color bit for a received subpacket changes (i.e., flips), then the terminal treats this subpacket as the first subpacket for a new encoder packet and would discard all subpackets previously received on the same ARQ channel.

Transmissions on all physical channels associated with the packet data channel occur in unit of slots, where one slot is 1.25 msec for cdma2000. Transmissions on the F-PDCH and F-PDCCH occur over durations of 1, 2, or 4 slots (i.e., 1.25 msec, 2.5 msec, or 5 msec), and transmissions on the R-ACKCH occur on 1.25 msec, 2.5 msec, or 5 msec slot intervals.

When a subpacket is transmitted on an ARQ channel, the packet data portion is transmitted on the F-PDCH and the corresponding control information is transmitted as a message on one of two F-PDCCHs, F-PDCCH0 and F-PDCCH1. When a terminal is assigned to the packet data channel, it is assigned a MAC identifier (MAC_ID) to uniquely address the terminal on the two shared F-PDCCHs. Messages on the F-PDCCHs are targeted to specific terminals by setting a MAC_ID field in each F-PDCCH SDU to the MAC_ID assigned to the terminal designated to receive the subpacket being transmitted on the F-PDCH.

Messages may be sent to the terminal on either of the two F-PDCCHs starting at any slot when the terminal is assigned to the packet data channel. Thus, the terminal would need to continuously monitor and process F-PDCCH0 to receive control messages. If no message were received on F-PDCCH0 dedicated for the terminal, then the terminal would also need to process F-PDCCH1 for the same time interval. If a control message received on either F-PDCCH0 or F-PDCCH1 indicates that a subpacket is transmitted to the terminal on the F-PDCH, then the terminal processes the F-PDCH to recover the subpacket. For simplicity, both F-PDCCH0 and also F-PDCCH1 are collectively referred to herein as the F-PDCCH.

Figure 4:
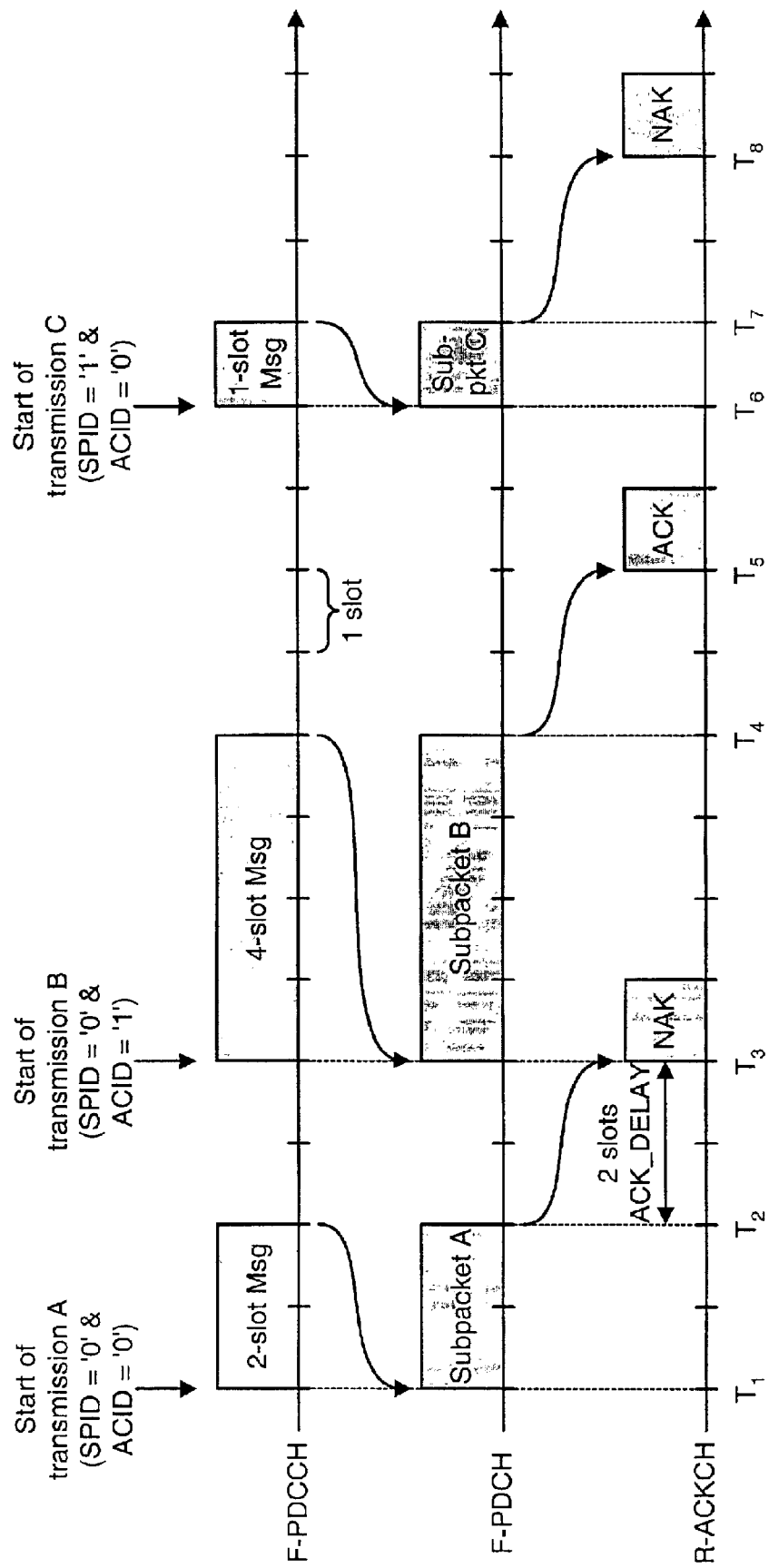
FIG. 4 is a timing diagram illustrating an example data transmission on the packet data channel.

FIG. 4 is a timing diagram illustrating an example data transmission on the packet data channel. This example shows three subpackets being transmitted with an ACK_DELAY of two slots. ACK_DELAY specifies the number of slots between the end of an F-PDCH transmission and the beginning of an R-ACKCH transmission for the corresponding F-PDCH transmission.

At time $T_1$, a two-slot message is transmitted on the F-PDCCH for the first subpacket assignment. This message indicates the initial transmission for a first ARQ channel, with SPID='0' and ACID='0'. Since the duration of the F-PDCCH message is two slots, the transmission of subpacket '0' on the F-PDCH is also two slots. In this example, the terminal receives the control message on the F-PDCCH, processes the F-PDCH, but fails to recover the HARQ packet for the first ARQ channel based on the received subpacket '0'. The terminal subsequently sends a NAK on the R-ACKCH at time $T_3$, which is two slots (or ACK_DELAY slots) after the end of the F-PDCH transmission at time $T_2$.

At time $T_3$, a four-slot message is transmitted on the F-PDCCH for a new subpacket assignment. This message indicates the initial transmission for a second ARQ channel, with SPID='0' and ACID='1'. Since the duration of the F-PDCCH message is four slots, the duration of the subpacket transmission on the F-PDCH is also four slots. In this example, the terminal is able to correctly decode the encoder packet for the second ARQ channel based on the received subpacket '0'. The terminal then sends an ACK on the R-ACKCH at time $T_5$, which is two slots after the end of the FPDCH transmission at time $T_4$.

At time $T_6$, a one-slot message is transmitted on the F-PDCCH for another subpacket assignment. This message indicates the retransmission of subpacket '1' for the current encoder packet on the first ARQ channel, with SPID='1' and ACID='0'. Since the duration of the F-PDCCH message is one slot, the duration of the subpacket transmission on the F-PDCH is also one slot. The terminal then combines the received subpackets '0' and '1' and attempts to decode the encoder packet for the first ARQ channel. In this example, the terminal fails to correctly decode the encoder packet based on the received subpackets '0' and '1'. The terminal then sends a NAK on the R-ACKCH at time $T_8$, which is two slots after the end of the F-PDCH transmission at time $T_7$.

In general, the receiver HARQ-CF may or may not provide ACK feedback for each subpacket transmitted for the receiver. The following scenarios cover each subpacket transmission:

If the receiver fails to receive the control information on the F-PDCCH, then it is unaware of the existence of the subpacket transmission. No feedback would then be transmitted by the receiver on the R-ACKCH for this subpacket transmission.

If the receiver receives the control message correctly but fails to recover the HARQ packet based on all the subpackets received for the particular encoder packet on the F-PDCH, then it is aware of the subpacket transmission and sends a NAK back to the transmitter.

If the receiver receives the control message on the F-PDCCH and is also able to recover the HARQ packet based on the subpackets received on the F-PDCH, then it sends an ACK back to the transmitter.

For each transmitted subpacket, the transmitter performs the appropriate responsive action based on the feedback (or lack thereof) received from the receiver. In particular, the transmitter performs the following:

If an ACK feedback is not received from the receiver for a subpacket transmission, then the transmitter HARQ- CF may retransmit another subpacket for the HARQ packet on the same ARQ channel. The transmitter HARQ-CF may transmit up to a certain maximum number of subpackets (e.g., 8) for each HARQ packet. If an ACK is received for a subpacket transmission, then the transmitter HARQ-CF stops the transmission/retransmission of any additional subpacket for the encoder packet.

The RLP and HARQ-CF entities at the transmitter and receiver are used to provide reliable data transmission on the packet data channel. The functions performed by each of these entities are summarized below. In the following description, a "missing" packet is one that has not yet been recovered/received by a particular entity, but which may belong to an incomplete encoder packet transmission transaction and thus may be recovered/received subsequently. A "lost" packet is one that a particular entity determines will not be recovered/received.

Transmitter HARQ-CF: This entity determines whether or not a given HARQ packet has been successfully delivered to the receiver by observing the ACK/NAK feedback received on the R-ACKCH. The transmitter HARQ-CF does not comprehend the contents of the HARQ packet. The reliance on the feedback on the R-ACKCH means that the transmitter HARQ-CF is susceptible to the following errors:

ACK becomes NAK: This error would trigger an unnecessary transmission of an additional subpacket to the receiver.

NAK becomes ACK: This error is highly undesirable since the RLP would then be relied upon to NAK each RLP frame included in the lost HARQ packet.

Transmitter RLP: This entity determines whether or not a given RLP frame has been successfully delivered to the receiver by waiting for a NAK from the receiver RLP. With the addition of the HARQ-CF in cdma2000 Release C, the transmitter RLP may need to wait for a long time before it receives the NAK from the receiver RLP for a missing RLP frame, as described below.

Receiver HARQ-CF: This entity attempts to decode each encoder packet sent by the transmitter HARQ-CF to recover the corresponding HARQ packet. If the receiver HARQ-CF receives a control message indicating a subpacket transmission for it, then it processes the F-PDCH to receive the subpacket, accumulates all subpackets received thus far for the encoder packet being processed, and decodes the accumulated subpacket to recover the HARQ packet. Based on the result of the decoding, the receiver HARQ-CF is able to determine whether or not the HARQ packet has been recovered correctly without too much delay. The receiver HARQ-CF does not know what is contained inside the HARQ packet.

The receiver HARQ-CF is aware of the transmission and existence of an encoder packet only if it detects at least one control message for each of the following: (1) the previous subpacket, (2) the current subpacket, and (3) the next subpacket, which are transmitted with the same ACID. In particular, the receiver HARQ-CF needs to observe the color bit flips in order to detect a new encoder packet. Consequently, the receiver HARQ-CF may not be able to immediately detect that an encoder packet has been transmitted (e.g., if it misses the control message, in which case it would have to wait for the next subpacket transmission).

Receiver RLP: This entity can determine whether an RLP frame is missing by looking at the sequence numbers of the received RLP frames. However, the receiver RLP is not able to determine within a short time period whether the missing RLP frame is (1) part of an HARQ packet that the receiver HARQ-CF is still trying to recover via additional subpacket retransmission(s) or (2) part of a lost HARQ packet that will not be recovered by the receiver HARQ-CF. The receiver RLP would need to wait a sufficient amount of time for the HARQ-CF retransmission to complete before sending a NAK for an RLP retransmission. As a result, the delay for the RLP retransmission of the missing RLP frame is typically long.

The HARQ-CF, which was added in cdma2000 Release C, extends the functionality of Layer 2 but impacts the operation of the RLP. Without the HARQ-CF (in cdma2000 Release 0, A, and B), RLP frames can be transmitted in serial order to the receiver. The RLP is then used to (1) deliver RLP frames in-order to higher layers and (2) perform RLP retransmission. Therefore, if the receiver RLP detects that an RLP frame is missing, it can send back a NAK immediately and request the RLP frame to be retransmitted.

With the HARQ-CF (in cdma2000 Release C), multiple HARQ packets may be transmitted in parallel to the receiver, with each HARQ packet including one or more RLP frames. Moreover, the HARQ-CF can transmit/retransmit each HARQ packet up to a specified maximum number of times until the HARQ packet is recovered correctly. As each HARQ packet is recovered by the receiver HARQ-CF, the RLP frame(s) included in the recovered HARQ packet are provided to the receiver RLP.

Since multiple HARQ packets may be transmitted in parallel by the HARQ-CF and since the RLP frame(s) in each HARQ packet may be sent by the receiver HARQ-CF to the receiver RLP at different times depending on when the HARQ packet is recovered by the receiver HARQ-CF, it is difficult for the receiver RLP to detect that a given RLP frame is actually lost. In particular, it is difficult for the receiver RLP to distinguish between two cases where (1) the lost RLP frame will not be provided by the receiver HARQ-CF and needs to be retransmitted by the RLP and (2) the missing RLP frame is part of a HARQ packet that is still being retransmitted by the HARQ-CF, which means that no RLP retransmission is required at this point.

In one RLP retransmission scheme to resolve the above ambiguity, the receiver RLP holds off requesting a RLP retransmission when it detects a missing RLP frame. Instead, the receiver RLP waits for a certain amount of time to elapse before it sends a NAK for the retransmission request. The purpose for the delayed NAK is to give the HARQ-CF sufficient amount of time to finish up the transmission of the HARQ packet. This scheme is also referred to as a "delayed NAK" RLP retransmission scheme.

Figure 5:
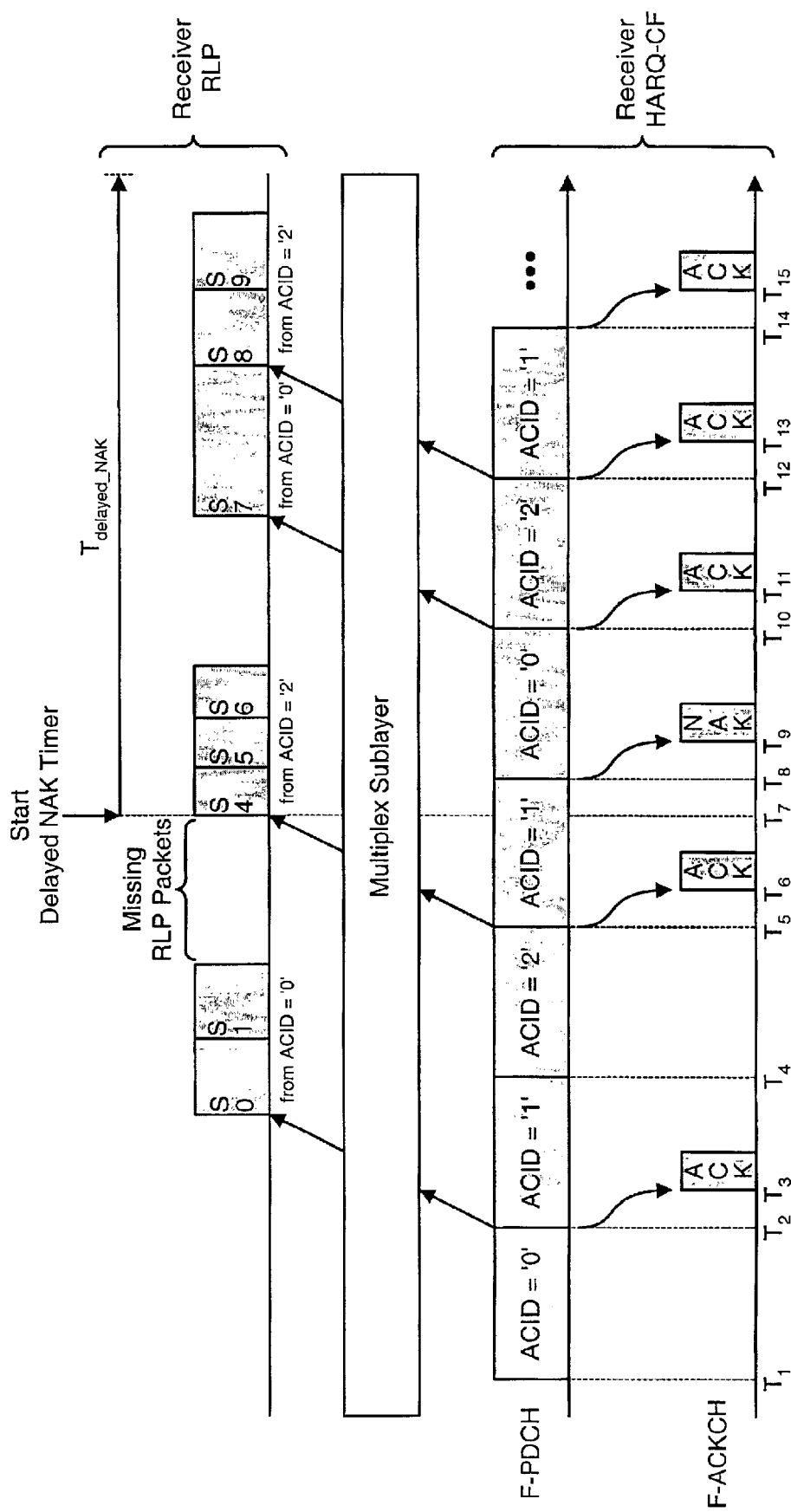
FIG. 5 is a diagram illustrating the interaction between a receiver RLP and a receiver HARQ-CF for data transmission on the packet data channel.

FIG. 5 is a diagram illustrating the interaction between the receiver RLP and the receiver HARQ-CF for data transmission on the packet data channel. This diagram also shows the operation of the delayed NAK RLP retransmission scheme. In this example, three ARQ channels with ACIDs of '0', '1', and '2' are used for the packet data channel transmission. For simplicity, the subpacket transmissions for this example are all of equal durations (i.e., same transmission lengths) which follow immediately one after another.

Starting at time $T_1$, the receiver HARQ-CF receives the control message on the F-PDCCH indicating a subpacket transmission for it on ARQ channel '0', processes the subpacket sent on this ARQ channel, and successfully recovers the HARQ packet transmitted on ARQ channel '0'. The recovered HARQ packet is then passed to the multiplex sublayer, which then provides the RLP frames included in this HARQ packet to the receiver RLP. The receiver HARQ-CF also transmits an ACK on the R-ACKCH at time $T_3$ for this HARQ packet.

For the next subpacket transmission starting at time $T_2$, the receiver HARQ-CF fails to detect the control message on the F-PDCCH. Consequently, no HARQ packet is recovered by the receiver HARQ-CF, and no RLP frames are provided to the receiver RLP. Moreover, the receiver HARQ-CF does not transmit anything on the R-ACKCH for this subpacket transmission.

Starting at time $T_4$, the receiver HARQ-CF receives the control message on the F-PDCCH indicating a subpacket transmission for it on ARQ channel '2', processes the subpacket sent on this ARQ channel, and successfully recovers the HARQ packet transmitted on ARQ channel '2'. This recovered HARQ packet is then passed to the multiplex sublayer, which then provides the RLP frames included in this HARQ packet to the receiver RLP. The receiver HARQ-CF also transmits an ACK on the R-ACKCH at time $T_6$ for this HARQ packet.

Starting at time $T_7$, the receiver RLP receives the RLP frames included in the HARQ packet recovered from ARQ channel '2'. The receiver RLP looks at the sequence numbers of these RLP frames and those received earlier from ARQ channel '0'. The receiver RLP then determines that there are two missing RLP frames. However, instead of immediately sending NAKs at the RLP sublayer to request retransmission of these missing RLP frames, the receiver RLP starts a delayed NAK timer for these missing RLP frames. The receiver RLP would then send the NAKs at the expiration of the delayed NAK timer.

Starting at time $T_6$, the receiver HARQ-CF receives the control message on the F-PDCCH indicating a subpacket transmission for it on ARQ channel '0', processes the subpacket sent on this ARQ channel, and fails to recover the HARQ packet transmitted on ARQ channel '0'. The retransmission on ARQ channel '0' is initiated by the transmitter HARQ-CF when it did not receive an ACK on the R-ACKCH for the HARQ packet sent earlier on this ARQ channel. Again, because the HARQ packet was not recovered correctly, no RLP frames are provided to the receiver RLP. However, the receiver RLP transmits a NAK on the R-ACKCH at time $T_9$ for this subpacket transmission.

The processing for subsequent subpacket transmissions occurs in a similar manner. As can be seen, the HARQ packets may be recovered in an unknown order by the receiver HARQ-CF. Consequently, the RLP frames provided to receiver RLP may also be out of sequence with missing holes.

The delayed NAK RLP retransmission scheme described above works if an appropriate value is selected for a delayed NAK timer. However, this timer value would need to be a very conservative value that would account for the longest possible retransmission delay for the HARQ-CF for all ARQ channels in use. A large timer value would unduly affect system performance and efficiency since the receiver RLP would need to wait for a long time before it can request the retransmission of each missing RLP frame.

Techniques are provided herein to exploit the functionality of the RLP and HARQ-CF so that they can operate in a seamless and efficient manner to enhance system performance. These techniques utilize different information available at different entities (e.g., the receiver RLP and receiver HARQ-CF) to implement a RLP transmission scheme that provides improved performance (e.g., at TCP) over the delayed NAK RLP retransmission scheme, which relies on delayed NAK with a conservative timer value.

When the receiver RLP detects a missing RLP frame, the missing frame may still be in the process of being transmitted by the underlying HARQ-CF. Therefore, the receiver RLP wants to wait for a certain amount of time to gain more confidence in its assessment that this RLP frame is really lost. Ideally, the receiver RLP would send a NAK only after it is totally sure that the RLP frame is actually lost in order to avoid unnecessary retransmission of the RLP frame through a false-alarm NAK. However, the receiver RLP is blind of the operation of the underlying HARQ-CF. Therefore, the value for the delayed NAK timer needs to be conservatively long.

In an aspect, a dynamic event-driven timer is maintained by the receiver HARQ-CF for each RLP frame determined by the receiver RLP to be missing. This dynamic timer has a variable duration and its expiration is triggered by events known to the receiver HARQ-CF, as described in further detail below. The receiver RLP may also maintain a fixed timer (i.e., a delayed NAK timer with a fixed time duration) for each missing RLP frame. The receiver RLP may then send a NAK back to the transmitter RLP to request a retransmission of the missing RLP frame if either the dynamic timer or the fixed timer expires for the RLP frame, whichever occurs first.

Figure 7:
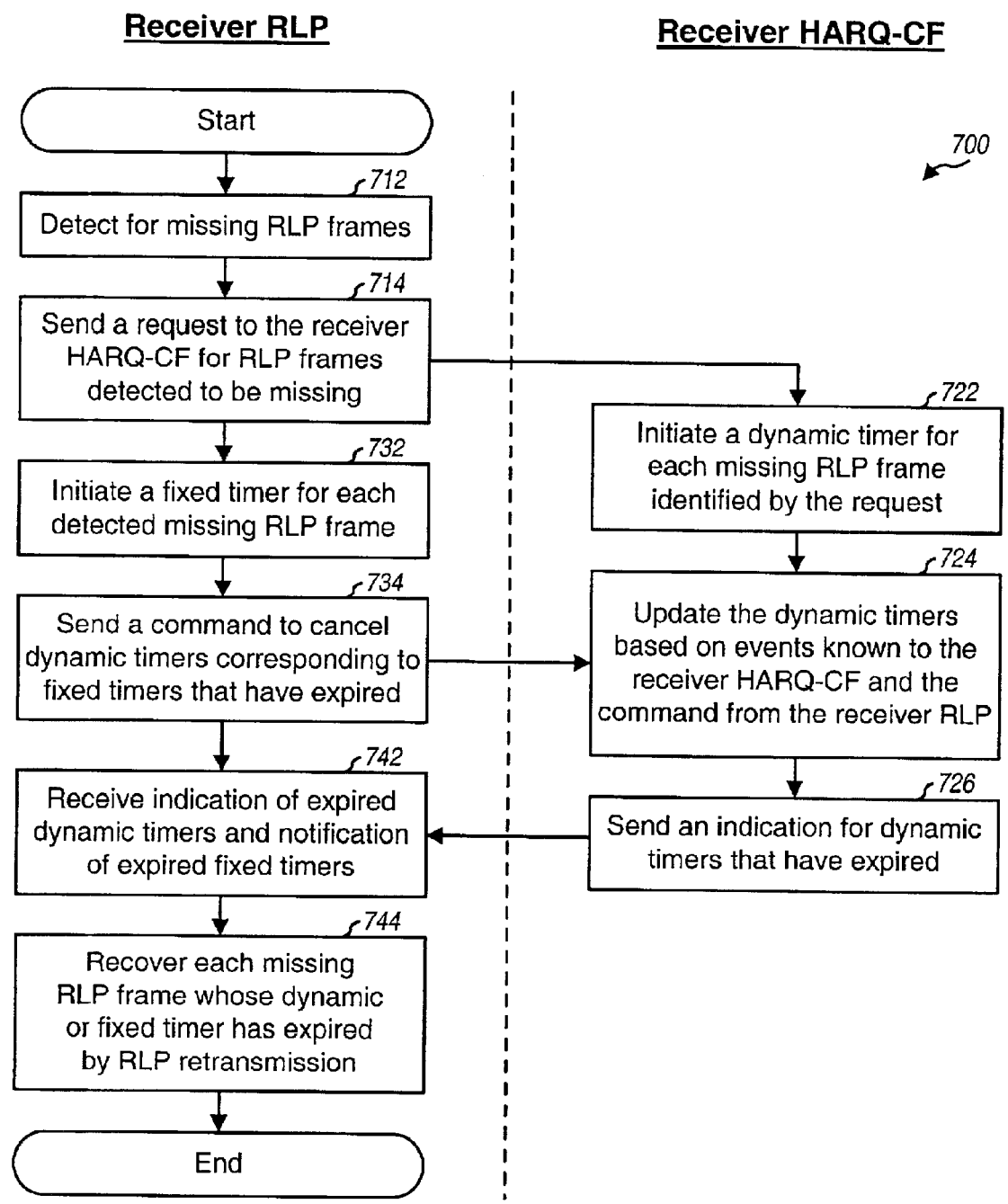
FIG. 7 is a flow diagram of a process for initiating retransmission of missing RLP frames at the RLP sublayer based on dynamic timers and fixed timers.

FIG. 7 is a flow diagram of an embodiment of a process 700 for initiating retransmission of missing RLP frames at the RLP sublayer based on dynamic timers and fixed timers maintained for missing RLP frames.

Initially, the receiver RLP detects for missing RLP frames (step 712). As shown in FIG. 5, this may be achieved by observing the sequence numbers of RLP frames received by the receiver RLP, and identifying missing RLP frames as those that would fall between the RLP frames already at the receiver RLP. If any missing RLP frames are detected, then the receiver RLP sends a "request" to the receiver HARQ-CF for the detected missing RLP frames (step 714). The request asks the receiver HARQ-CF to maintain a dynamic timer for each missing RLP frame. In an embodiment, since RLP frames are identified by their sequence numbers, which are available to the receiver RLP but not to the receiver HARQ-CF, the receiver RLP provides the sequence numbers for the missing RLP frames along with each request it sends to the receiver HARQ-CF.

Upon receiving the request from the receiver RLP, the receiver HARQ-CF initiates a dynamic timer for each missing RLP frame that is identified by the sequence number list included with the request (step 722). Each dynamic timer maintained by the receiver HARQ-CF is thus associated with the sequence number of a specific missing RLP frame. The receiver HARQ-CF thereafter maintains each dynamic timer and updates the dynamic timer state based on events known to the receiver HARQ-CF (step 724). Each dynamic timer may also expire based on the occurrence of certain events, and different dynamic timers may be affected by different events. The maintenance of the dynamic timers and the conditions for timer expiration are described in further detail below.

The receiver HARQ-CF sends an "indication" to the receiver RLP whenever the dynamic timer for a given missing RLP frame expires (step 726). If multiple dynamic timers expire for multiple missing RLP frames, then one indication may be sent for all such packets. In an embodiment, a list of sequence numbers of all missing RLP frames whose dynamic timers have expired is sent along with the indication. The indication informs the receiver RLP that the HARQ transmission/retransmissions for these RLP frames are completely done and to not expect the receiver HARQ-CF to deliver these RLP frames. The receiver RLP would interpret the indication to mean the identified missing RLP frames are indeed lost.

In the embodiment shown in FIG. 7, the receiver RLP also initiates a fixed timer for each missing RLP frame (step 732). The value for the fixed timer may be configurable by the system at the start of operation on the packet data channel and may thereafter be fixed for the duration of the packet data channel operation. When the fixed timer for a missing RLP frame expires, the receiver RLP can send a "command" to the receiver HARQ-CF to cancel the corresponding dynamic timer maintained by the receiver HARQ-CF for this RLP frame (step 734). When an once missing RLP frame is received after the dynamic timer for the frame is triggered, the receiver RLP can also send a command to the receiver HARQ-CF to cancel the dynamic timer.

The receiver RLP receives the indication from the receiver HARQ-CF and "notification" of the expiration of any fixed timer (step 742). The receiver RLP then initiates the recovery of each missing RLP frame whose fixed timer has expired or whose dynamic timer has expired (step 744). This RLP frame may be recovered via retransmission at the RLP sublayer. The steps shown in FIG. 7 may be performed periodically or at designated times. For example, the steps for the receiver RLP may be performed whenever RLP frames are provided to the receiver RLP, and the steps for the receiver HARQ-CF may be performed at the end of each subpacket transmission on the F-PDCH.

As noted above, the receiver HARQ-CF may be provided with a list of missing RLP frames by the receiver RLP. The receiver HARQ-CF is then instructed to maintain a dynamic timer for each of the missing RLP frames. Each such dynamic timer expires when it is determined that the missing RLP frame will not be recovered by the receiver HARQ-CF. However, RLP frames are included in HARQ packets and since the receiver HARQ-CF does not know the contents of the recovered HARQ packets, it is not able to specifically identify the RLP frames that were included in the recovered HARQ packets.

Techniques are provided herein for the receiver HARQ-CF to determine whether or not a particular missing RLP frame is lost without having access to the sequence numbers of RLP frames that it may have recovered. In an embodiment, this is achieved by successively eliminating all possible ARQ channels that may have been used to transmit the HARQ packet that includes the missing RLP frame, until no ARQ channel is left. At this point, the missing RLP frame is deemed to be lost and its dynamic timer expires.

Figure 8:
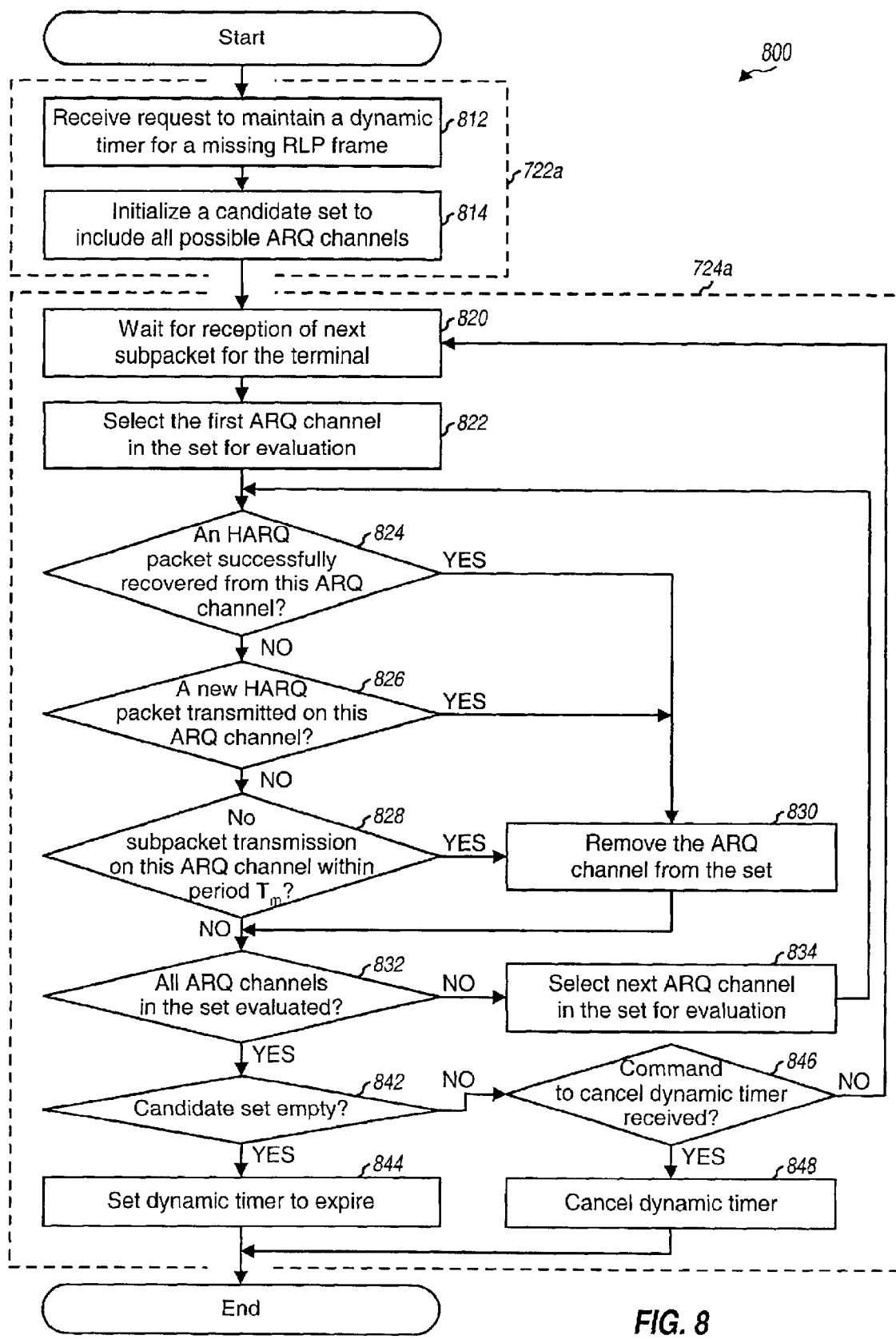
FIG. 8 is a flow diagram of a process for determining whether or not a particular missing RLP frame is lost based on transmissions on the F-PDCH.

FIG. 8 is a flow diagram of an embodiment of a process 800 for determining whether or not a particular missing RLP frame is lost based on the subpacket transmissions on the F-PDCH. Process 800 may be used for each RLP frame detected to be missing by the receiver RLP. Process 800 includes a set of steps 722a that initializes a dynamic timer for the missing RLP frame and a set of steps 724a that updates the dynamic timer. Steps 722a may be used for step 722 in FIG. 7, and steps 724a may be used for step 724.

Initially, a request is received from the receiver RLP to maintain a dynamic timer for the missing RLP frame (step 812). Upon receiving the request, the receiver HARQ-CF initializes a candidate set to include all possible ARQ channels that may be used to transmit the HARQ packet that includes the missing RLP frame (step 814). This candidate set typically includes all ARQ channels assigned to the receiver for packet data channel transmission, except for the ARQ channel that just delivered a set of good RLP frames to the receiver RLP (which is referred to as the "omitted" ARQ channel).

As shown in FIG. 5, the receiver RLP is able to detect that a particular RLP frame is missing at near time $T_7$ after it has received a set of good RLP frames that were included in a good HARQ packet recovered from a particular ARQ channel. This ARQ channel could not have been the one used to transmit the bad HARQ packet with the missing RLP frames, since the transmitter HARQ-CF would not have sent the good HARQ packet on the same ARQ channel until the bad HARQ packet had been successfully recovered by the receiver HARQ-CF.

Referring back to FIG. 8, steps 812 and 814 are performed once upon receiving the request, to initialize the dynamic timer for the missing RLP frame. Thereafter, the dynamic timer is updated by performing steps 820 through 848. The updating may be achieved by evaluating each ARQ channel in the candidate set to determine whether or not it could be the one used to transmit the HARQ packet that includes the missing RLP frame.

When the dynamic timer is initialized, the terminal waits for the reception of the next subpacket dedicated to the terminal (step 820). When the next subpacket is received and the corresponding PDCH is processed, the dynamic timer updating commences by selecting the first ARQ channel in the candidate set for evaluation (step 822). A determination is then made whether or not a HARQ packet has been successfully recovered from this ARQ channel (step 824). If the answer is yes, then this ARQ channel is removed from the candidate set (step 830). The rational for removing this ARQ channel is the same as for not including the omitted ARQ channel in the candidate set. If the missing RLP frame is transmitted on the ARQ channel, then the receiver RLP will cancel this dynamic timer upon receiving the corresponding RLP frame.

Otherwise, after step 824, a determination is made whether or not a new HARQ packet has been transmitted on the ARQ channel (step 826). A "new" HARQ packet denotes a new HARQ packet that starts being transmitted after the dynamic timer is initialized. If the answer is yes, then this ARQ channel is removed from the candidate set (step 830). The new HARQ packet may have been transmitted on this ARQ channel for any one of several reasons. First, the transmitter HARQ-CF may transmit a new HARQ packet after a maximum number of transmission/retransmission of a prior HARQ packet, which may have included the missing RLP frame. Second, the transmitter HARQ-CF may have erroneously detected an ACK bit for the prior HARQ packet and assumed that the prior HARQ packet was correctly recovered. In any case, the receiver HARQ-CF can be confident that no additional subpacket transmissions for the prior HARQ packet will be sent on this ARQ channel. Thus, the ARQ channel may be removed from the candidate set.

The transmission of a new HARQ packet on the ARQ channel may be detected by observing the color bit sent on the F-PDCCH for each subpacket transmission. As noted above, the color bit is toggled for each new HARQ packet sent on the ARQ channel. Denote a "new" HARQ packet as a new HARQ packet that starts being transmitted after the dynamic timer is initialized, and the "previous" HARQ packet as the HARQ packet that is already being transmitted when the dynamic timer is initialized. At the time when the dynamic timer is initialized, if the terminal detects the presence of the "previous" HARQ packet, the transmission of a "new" HARQ packet may be detected by observing the color bit for the ARQ channel flips once (i.e., a change from the old value for the prior HARQ packet to the new value for the new HARQ packet). However, the receiver HARQ-CF may fail to detect the presence of the "previous" HARQ packet at the time when the dynamic timer is initialized. This usually happens if the terminal fails to detect the associated control messages of all prior subpackets for the encoder packet. In this case, when the terminal observes the first color bit change after the dynamic timer is initialized, it just detects the presence of the "previous" HARQ packet. In order to detect the presence of the "new" HARQ packet (and the completion of the "previous" HARQ packet), the terminal needs to observe two color bit value changes. Thus, a "new" HARQ packet may be detected with greater confidence by observing the color bit flips twice.

Otherwise, after step 826, a determination is made whether or not any subpacket transmission has been received on this ARQ channel within the past period $T_m$ (step 828). In one embodiment, this time period corresponds to M consecutive times that the receiver is scheduled after the dynamic timer is initialized. The parameter M may be selected based on various factors such as, for example, (1) the total number of ARQ channels assigned to the receiver for packet data channel transmission, and (2) the maximum number of transmission/retransmissions for each HARQ packet. In general, M is set bigger if the likelihood of using the ARQ channel is less, which is the case if more ARQ channels are assigned or fewer retransmissions are permitted. In one specific embodiment, M may be set as follows:

$$\#\text{ARQ channel} \leq M \leq \alpha \cdot (\#\text{ARQ channel}),$$

where $\alpha$ is a suitably selected constant greater than one. If the answer for step 828 is yes, then this ARQ channel is removed from the candidate set (step 830).

In one embodiment, the testing can be implemented by setting up a counter for each ARQ channel in the candidate set. Each counter is initialized to zero. The counter for a particular ARQ channel increments when a subpacket is received for the terminal but on some other ARQ channel. The counter is reset to zero when a subpacket is received for the terminal and on this ARQ channel. When the counter reaches M, the ARQ channel is removed from the candidate set.

A scheduler at the transmitter typically gives higher priority to encoder packets that have been in a transmit queue longer. Moreover, encoder packets are typically transmitted in an order based on their priorities. In this case, the pending HARQ packets are typically retransmitted according to their order in the transmit queue. The parameter M may be selected based on and to account for the degree of validity of the above two assumptions.

If the answer for step 828 is no or if the ARQ channel has been removed from the candidate set in step 830, then a determination is made whether or not all ARQ channels in the candidate set have been evaluated (step 832). If the answer is no, then the next ARQ channel in the set is selected (step 834) and the process then returns to step 824 to evaluate this ARQ channel.

Otherwise, if all ARQ channels in the set have been evaluated, as determined in step 832, then a determination is made whether or not the candidate set is empty (step 842). If the candidate set is empty, then there is no ARQ channel that may be used to transmit the HARQ packet that may include the missing RLP frame, and the dynamic timer for the missing RLP frame is set to expire (step 844). If the candidate set is not empty but a command is received from the receiver RLP to cancel the dynamic timer (e.g., upon expiration of the fixed timer maintained by the receiver RLP for the missing RLP frame or recovery of the missing frame), as determined in step 846, then the dynamic timer is canceled (step 848). Otherwise, if the candidate set is not empty and no commands are received from the receiver RLP to cancel the dynamic timer, then the process returns to step 820 and the terminal waits for the next subpacket dedicated to it. The process terminates upon the expiration or cancellation of the dynamic timer.

The dynamic timer is updated periodically at the end of each subpacket reception on the F-PDCH. If the dynamic timer expires after any update, then the receiver HARQ-CF can send an indication to the receiver RLP for the missing RLP frame.

The process shown in FIG. 8 effectively determines a candidate set of all possible ARQ channels that may have been used to transmit the HARQ packet with the missing RLP frame and eliminates each ARQ channel in the candidate set that could not be used to transmit this HARQ packet. The missing RLP frame could still be retransmitted on any ARQ channels in the candidate set when the request is sent. By evaluating different events, the receiver HARQ-CF can eliminate the possibility that the RLP frame is still being transmitted on any one of the ARQ channels. This is the purpose for trimming down the candidate set. Once the receiver HARQ-CF determines that the missing RLP frame is no longer being transmitted on any of the ARQ channels, then it sends the indication. The process in FIG. 8 thus successively eliminates the possible candidate ARQ channels.

Other criteria for eliminating possible ARQ channels from the candidate set may also be used, and this is within the scope of the invention. Moreover, it is not necessary to implement all three criteria shown in FIG. 8. For example, the criterion shown in step 828 may be omitted and the fixed timer maintained by the receiver RLP may be relied upon to "time-out" the dynamic timer.

The ACK/NAK mechanism of the HARQ-CF below the RLP may be exploited to improve the reliability of data transmission on the packet data channel. In one embodiment, when the transmitter HARQ-CF realizes that a particular encoder packet is lost (after a certain number of retransmissions for this encoder packet), the transmitter HARQ-CF can retransmit the encoder packet once more on the same ARQ channel but with a different color bit value. This will then force the receiver to purge all subpackets that have been received for the encoder packet and start the decoding process anew. This autonomous transmitter HARQ-CF retransmission scheme allows a lost encoder packet to be retransmitted without waiting for the delayed NAK from the receiver RLP, which may occur after a longer delay.

If autonomous retransmission by the transmitter HARQ-CF is employed, then the updating of the dynamic timer for a missing RLP frame in FIG. 8 may be modified to account for the possible retransmission of the same encoder packet with a new color bit value. In one embodiment, for step 826 in FIG. 8, a new HARQ packet may be detected to have been transmitted on the ARQ channel if the color bit flips three times (instead of twice).

Other mechanisms for determining at the receiver HARQ-CF whether or not a missing RLP frame is lost may also be implemented, and this is within the scope of the invention.

Figure 6:
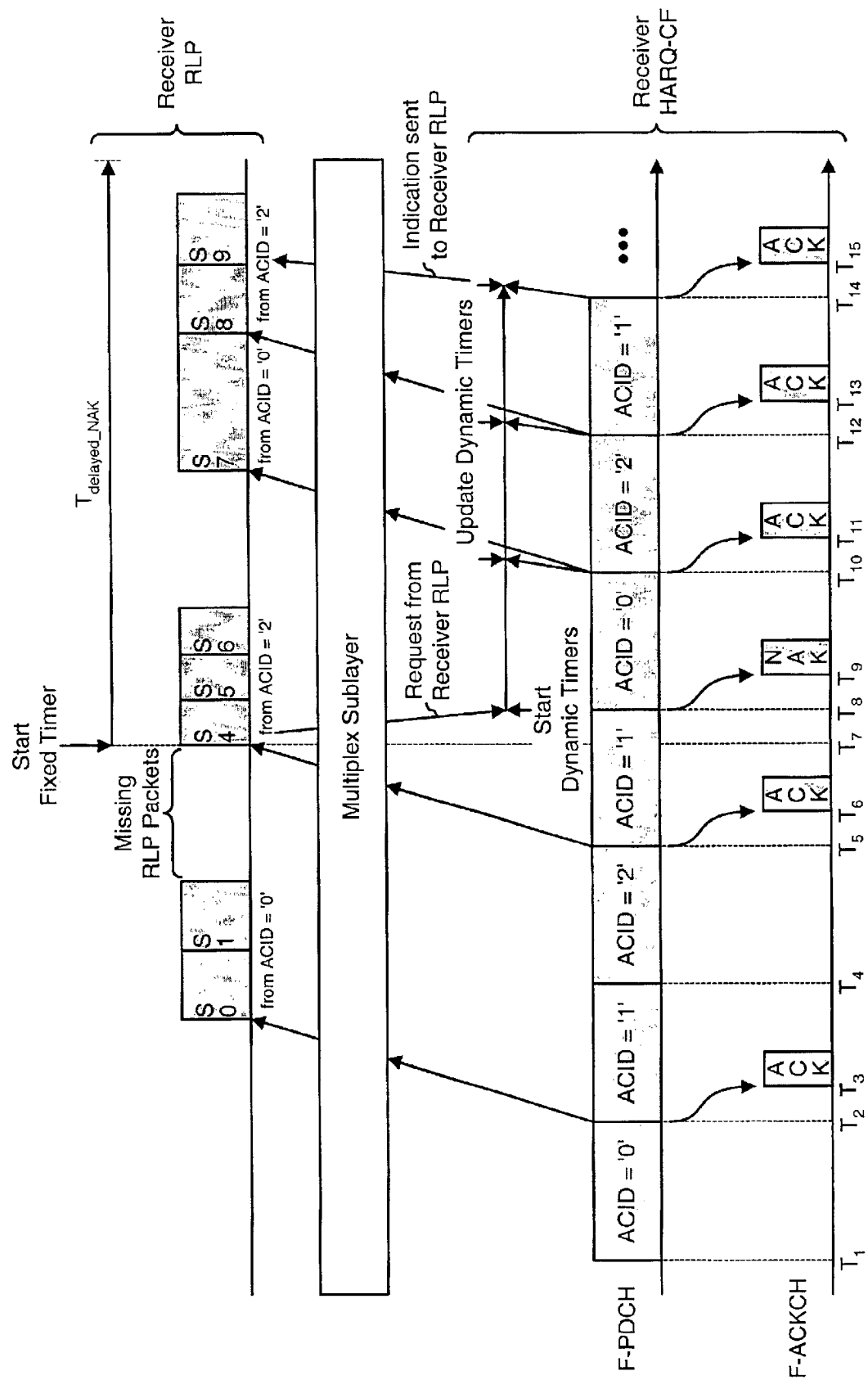
FIG. 6 is a diagram illustrating the interaction between the receiver RLP and receiver HARQ-CF for data transmission on the packet data channel with fixed and dynamic timers.

FIG. 6 is a diagram illustrating the interaction between the receiver RLP and the receiver HARQ-CF for data transmission on the packet data channel with the fixed and dynamic timers described above. The example of the packet data channel transmission in FIG. 6 is the same as that described above for FIG. 5. In particular, three ARQ channels with ACIDs of '0', '1', and '2' are used, and the subpacket transmissions are all of equal durations and follow immediately one after another.

As described above, near time $T_7$, the receiver RLP determines that there are two missing RLP frames with sequence numbers S2 and S3. The receiver RLP then starts a fixed timer for these missing RLP frames and also sends a request to the receiver HARQ-CF to start dynamic timers for these frames.

Upon receiving the request, the receiver HARQ-CF starts two dynamic timers, Timer_A and Timer_B, for the two missing RLP frames with sequence numbers S2 and S3, respectively. To initialize these dynamic timers, the receiver HARQ-CF forms a candidate set for each missing RLP frame. The candidate sets $C_A$ and $C_B$ for Timer_A and Timer_B, respectively, would each include ACID='0' and ACID='1', but not ACID='2' since this ARQ channel provides the last good HARQ packet.

The receiver HARQ-CF then updates the active dynamic timers after each received subpacket transmission dedicated to the terminal. Shortly after time $T_{10}$, the receiver HARQ-CF determines that a good HARQ packet was recovered from ARQ channel '0', and ACID='0' is removed from both candidate sets $C_A$ and $C_B$. Each candidate set would now only include ACID='1'. The receiver HARQ-CF transmits an ACK on the R-ACKCH at time $T_{11}$ for this HARQ packet. Shortly after time $T_{12}$, the receiver HARQ-CF determines that a good HARQ packet was recovered from ARQ channel '2', which is not included in candidate sets $C_A$ and $C_B$. The receiver HARP-CF transmits an ACK on the R-ACKCH at time $T_{13}$ for this HARQ packet. Thus, no changes take place on candidate sets $C_A$ and $C_B$ for this subpacket transmission. Shortly after time $T_{14}$, the receiver HARQ-CF determines that a good HARQ packet was recovered from ARQ channel '1', and ACID='1' is removed from both candidate sets $C_A$ and $C_B$. The receiver HARQ-CF transmits an ACK on the R-ACKCH at time $T_{15}$ for this HARQ packet. The receiver HARQ-CF then determines that candidate sets $C_A$ and $C_B$ are both empty. As a result, the two dynamic timers, Timer_A and Timer_B, are set to expire. The receiver HARQ-CF would then send an indication to the receiver RLP with sequence numbers S2 and S3 associated with the expired Timer_A and Timer_B.

The example shown in FIG. 6 shows the removal of each ACID in the two candidate sets based on recovery of good HARQ packet on the ARQ channel. The other two criteria described in FIG. 8 for removing ARQ channels from the candidate sets were not invoked.

The techniques described herein may be used to provide improved RLP retransmission for systems having an underlying HARQ retransmission mechanism. These techniques may be used for various communication systems such as cdma2000 CDMA systems, W-CDMA systems, and so on. The techniques may also be applied to other communication systems having an upper retransmission mechanism (corresponding to the RLP) and a lower retransmission mechanism (corresponding to the HARQ-CF). These techniques may also be used for other types of communication systems (e.g., TDMA and FDMA systems).

Figure 9:
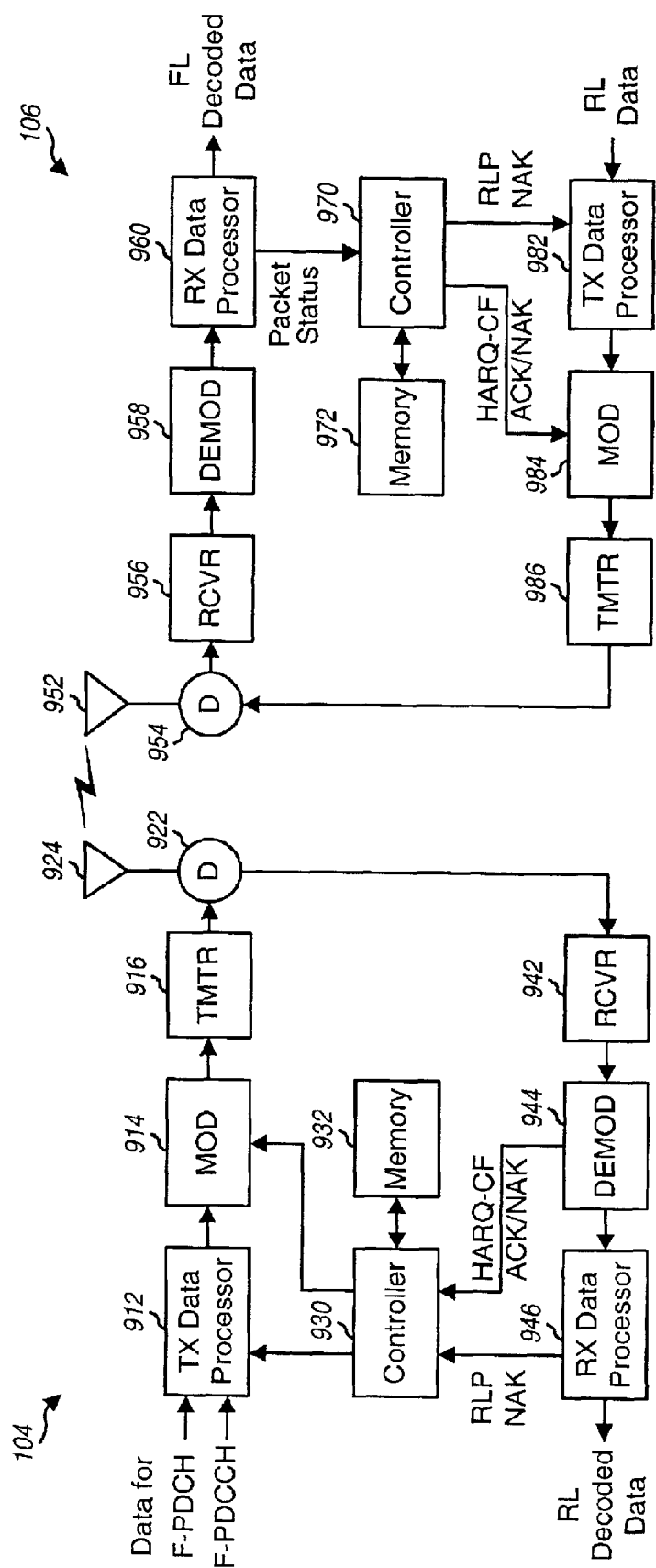
FIG. 9 is a block diagram of an embodiment of a base station and a terminal.

FIG. 9 is a block diagram of an embodiment of base station 104 and terminal 106. On the forward link, data for the F-PDCH and F-PDCCH for a particular terminal designated to receive packet data channel transmission is received and processed (e.g., formatted, encoded, and so on) by a transmit (TX) data processor 912. The processing for the F-PDCH and F-PDCCH may be performed as described in the cdma2000 standard documents. The processed data is then provided to a modulator (MOD) 914 and further processed (e.g., channelized, spread, and so on) to provide modulated data. A transmitter (TMTR) unit 916 then converts the modulated data into one or more analog signals, which are further conditioned (e.g., amplified, filtered, and frequency upconverted) to provide a forward link signal. The forward link signal is routed through a duplexer (D) 922 and transmitted via an antenna 924 to the designated terminal.

At the terminal, the forward link signal is received by an antenna 952, routed through a duplexer 954, and provided to a receiver (RCVR) unit 956. Receiver unit 956 conditions (e.g., filters, amplifies, and frequency downconverts) the received signal and further digitizes the conditioned signal to provide samples. A demodulator 958 then receives and processes (e.g., despreads, channelizes, and data demodulates) the samples to provide symbols. Demodulator 958 may implement a rake receiver that can process multiple instances (or multipath components) of the received signal to provide combined symbols. A receive (RX) data processor 960 then decodes the symbols, checks the received packets/frames, and provides the decoded data. The processing by demodulator 958 and RX data processor 960 is complementary to the processing by modulator 914 and TX data processor 912, respectively.

In one embodiment, RX data processor 960 performs the processing for the physical layer and the HARQ-CF, and a controller 970 performs the processing for the RLP. For this embodiment, RX data processor 960 may provide (1) the decoded data for each HARQ packet recovered correctly, (2) the status of each subpacket transmission (e.g., ACK or NAK), (3) indications of expired dynamic timers, and so on. Controller 970 may then detect for missing RLP frames and provide request for RLP frames detected to be missing. Controller 970 further provides the appropriate NAK feedback for the receiver RLP to a TX data processor 982 and the ACK/NAK feedback for the receiver HARQ-CF to a modulator 984.

On the reverse link, data for the reverse link and RLP feedback information are processed (e.g., formatted, encoded, and so on) by TX data processor 982, further processed (e.g., channelized, spread, and so on) by modulator 984, and conditioned (e.g., converted to analog signals, amplified, filtered, and frequency upconverted) by a transmitter unit 986 to provide a reverse link signal. The reverse link signal is then routed through duplexer 954 and transmitted via antenna 952 to the base station.

At the base station, the reverse link signal is received by antenna 924, routed through duplexer 922, and provided to a receiver unit 942. Receiver unit 942 conditions (e.g., frequency downconverts, filters, and amplifies) the received signal and further digitizes the conditioned signal to provide a stream of samples. A demodulator 944 then processes (e.g., despreads, channelizes, and so on) the samples to provide symbols, and an RX data processor 946 further processes the symbols to provide the decoded data for the terminal. The data processing for the forward and reverse links is described by the cdma2000 standard documents.

A controller 930 receives the HARQ-CF ACK/NAK feedback from demodulator 944 and the RLP NAK feedback from RX data processor 946 and directs the appropriate retransmission for the HARQ-CF and RLP.

Controllers 930 and 970 further control the processing at the base station and the terminal, respectively. Each controller may also be designed to implement all or a portion of the techniques described herein for RLP retransmission. Program codes and data required by controllers 930 and 970 may be stored in memory units 932 and 972, respectively.

The techniques described herein for RLP retransmission may be implemented by various means. For example, these techniques may be implemented in hardware, software, or a combination thereof. For a hardware implementation, the elements used to implement the techniques (e.g., the elements that perform the processes shown in FIGS. 7 and 8) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, these techniques may be implemented with modules (e.g., procedures, functions, and so on) that perform the functions described herein. The software codes may be stored in a memory unit (e.g., memory units 932 and 972 in FIG. 9) and executed by a processor (e.g., controllers 930 and 970). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system with a first retransmission mechanism in a first sublayer and a second retransmission mechanism in a second sublayer, a method for retransmitting data with the first retransmission mechanism, comprising:
   detecting missing frames in the first sublayer;
   initiating a dynamic timers for each missing frames in the first sublayer, the dynamic timer for each missing frame associated with a respective candidate set of logical channels that may be used to transmit the missing frame;
   removing, from the set of logical channels, logical channels identified as conveying, at the second sublayer, packets associated with frames successfully received at the first sublayer:
   updating the dynamic timers based on a determination that the candidate set is empty; and
   determining whether or not the frames detected to be missing are lost based on the one or more dynamic timers.

2. The method of claim 1, wherein a logical channel is also removed from a candidate set if a new packet in the second layer is transmitted via the logical channel.

3. The method of claim 1, wherein a logical channel is also removed from a candidate set if no transmission is received via the logical channel within a particular time period.

4. In a CDMA communication system with a first retransmission mechanism provided by a Radio Link Protocol (RLP) and a second retransmission mechanism provided by a hybrid automatic retransmission control function (HARQ-CF), a method for retransmitting data via the RLP, comprising:
   detecting missing RLP frames;
   initiating a dynamic timer for each RLP frame, each dynamic timer associated with a respective candidate set of ARQ channels that may be used to transmit the missing RLP frame;
   removing, from the set of ARQ channels, ARQ channels identified as conveying, at the HARQ-CF sublayer, HARQ packets associated with successfully received RLP frames;
   updating each dynamic timer based on a determination that the representative candidate set is empty; and
   determining whether or not each RLP frame detected to be missing is lost based on the dynamic timer maintained for the RLP frame.

5. The method of claim 4, wherein an ARQ channel is removed from a candidate set if a new HARQ packet is transmitted via the ARQ channel.

6. The method of claim 4, wherein an ARQ channel is also removed from a candidate set if no transmission is received via the ARQ channel within a particular time period.

7. The method of claim 6, wherein the particular time period is selected based on likelihood of receiving a transmission on a given ARQ channel.

8. A method for detecting lost frames in a communication system having a first retransmission mechanism in a first sublayer and a second retransmission mechanism in a second sublayer, the method comprising:
   initiating a dynamic timer for a missing frame detected as missing at a first sublayer, the dynamic timer associated with a candidate set of logical channels that may be used to transmit the missing frame;
   removing, from the candidate set of logical channels, logical channels through which packets associated with successfully received frames at the first sublayer have been received at a second sublayer;
   updating the dynamic timer when the candidate set is empty; and
   determining the missing frame is a lost frame based on the dynamic timer.

9. A method in accordance with claim 8, wherein the updating the dynamic timer comprises setting the dynamic timer to expire.

10. A method in accordance with claim 8, wherein the first sublayer is in accordance with a Radio Link Protocol (RLP) and the second sublayer is in accordance with a hybrid automatic retransmission control function (HARQ-CF) residing under the RLP.

11. A method in accordance with claim 8, wherein the determining the missing frame is a lost frame comprises determining the missing frame is a lost frame when the dynamic timer expires.

12. A method in accordance with claim 8, further comprising:
   requesting a retransmission of the lost frame in the first sublayer using the first retransmission mechanism.

13. A method in accordance with claim 8, wherein the removing comprises removing logical channels through which no packet has been transmitted within a time period.

14. A method in accordance with claim 8, further comprising:
   initiating each of a plurality of dynamic timers for each of a plurality of missing frames.

15. A method in accordance with claim 8, further comprising:
   canceling the dynamic timer when the missing frame is received.

16. A processor for detecting lost frames in a communication system having a first retransmission mechanism in a first sublayer and a second retransmission mechanism in a second sublayer, the processor configured execute the steps of:
   initiating a dynamic timer for a missing frame detected as missing at a first sublayer, the dynamic timer associated with a candidate set of logical channels that may be used to transmit the missing frame;
   removing, from the candidate set of logical channels, logical channels through which packets associated with successfully received frames at the first sublayer have been received at a second sublayer;

updating the dynamic timer when the candidate set is empty; and determining the missing frame is a lost frame based on the dynamic timer.

17. A processor in accordance with claim 16, wherein the updating the dynamic timer comprises setting the dynamic timer to expire.

18. A processor in accordance with claim 16, wherein the first sublayer is in accordance with a Radio Link Protocol (RLP) and the second sublayer is in accordance with a hybrid automatic retransmission control function (HARQ-CF) residing under the RLP.

19. A processor in accordance with claim 16, wherein the determining the missing frame is a lost frame comprises determining the missing frame is a lost frame when the dynamic timer expires.

20. A processor in accordance with claim 19, the processor further configured to execute the step of:

requesting a retransmission of the lost frame in the first sublayer using the first retransmission mechanism.

21. A processor in accordance with claim 16, wherein the removing comprises removing logical channels through which no packet has been transmitted within a time period.

22. A processor in accordance with claim 16, the processor further configured to execute the step of:

initiating each of a plurality of dynamic timers for each of a plurality of missing frames.

23. A processor in accordance with claim 16, the processor further configured to execute the step of:

canceling the dynamic timer when the missing frame is received.

24. A receiver in a wireless communication system with a first retransmission mechanism in a first sublayer and a second retransmission mechanism in a second sublayer, the receiver comprising:

a RX data processor operative to process a data transmission to provided decoded data; and a controller operative to:

initiate a dynamic timer for a missing frame detected as missing at a first sublayer, the dynamic timer associated with a candidate set of logical channels that may be used to transmit the missing frame;

remove, from the candidate set of logical channels, logical channels through which packets associated with successfully received frames at the first sublayer have been received at a second sublayer;

update the dynamic timer when the candidate set is empty; and determine the missing frame is a lost frame based on the dynamic timer.

25. A receiver in accordance with claim 24, the controller operative to update the dynamic timer by setting the dynamic timer to expire.

26. A receiver in accordance with claim 24, wherein the first sublayer is in accordance with a Radio Link Protocol (RLP) and the second sublayer is in accordance with a hybrid automatic retransmission control function (HARQ-CF) residing under the RLP.

27. A receiver in accordance with claim 24, wherein the controller is further operative to determine the missing frame is a lost frame by determining the missing frame is a lost frame when the dynamic timer expires.

28. A receiver in accordance with claim 27, the controller further operative to:

request a retransmission of the lost frame in the first sublayer using the first retransmission mechanism.

29. A receiver in accordance with claim 24, wherein the controller is operative to remove, from the candidate set, logical channels through which no packet has been transmitted within a time period.

30. A receiver in accordance with claim 24, wherein the controller is operative to initiate each of a plurality of dynamic timers for each of a plurality of missing frames.

31. A receiver in accordance with claim 24, wherein the controller is operative to cancel the dynamic timer when the missing frame is received.

* * * * *